(12) United States Patent  (10) Patent No.: US 7,730,423 B2
Graham  (45) Date of Patent: Jun. 1, 2010

(54) METHOD AND SYSTEM FOR ORGANIZING DOCUMENT INFORMATION

(75) Inventor: Jamey Graham, San Jose, CA (US)

(73) Assignee: Ricoh Company, Ltd., Tokyo (JP)

( * ) Notice: Subject to any disclaimer, the term of this patent is extended or adjusted under 35 U.S.C. 154(b) by 802 days.

(21) Appl. No.: 09/949,296

(22) Filed: Sep. 6, 2001

(65) Prior Publication Data

US 2002/0067380 A1   Jun. 6, 2002

Related U.S. Application Data

(62) Division of application No. 09/274,829, filed on Mar. 23, 1999, now Pat. No. 6,310,633.

(51) Int. Cl.
*G06F 3/048* (2006.01)

(52) U.S. Cl. .................. 715/828; 715/848; 715/852; 715/757

(58) Field of Classification Search ............ 345/838, 345/854, 794, 792, 797; 715/838, 854, 794, 715/792, 797, 976, 828, 848, 852, 757
See application file for complete search history.

(56) References Cited

U.S. PATENT DOCUMENTS

| | | |
|---|---|---|
| 4,417,239 A | 11/1983 | Demke et al. |
| 4,823,303 A | 4/1989 | Terasawa |
| 5,153,831 A | 10/1992 | Yianilos |
| 5,309,359 A | 5/1994 | Katz et al. |
| 5,339,391 A * | 8/1994 | Wroblewski et al. ........ 345/607 |
| 5,384,703 A | 1/1995 | Withgott et al. |

(Continued)

FOREIGN PATENT DOCUMENTS

EP   0737927 A2   10/1996

(Continued)

OTHER PUBLICATIONS

Begole, et al., "Supporting Worker Independence in Collaboration Transparency," doc. ID:ncstrl.vatech_cs/TR-98-12, Virginia Polytechnic Institute and State University (1994).

(Continued)

*Primary Examiner*—Simon Ke
(74) *Attorney, Agent, or Firm*—Townsend and Townsend and Crew LLP

(57) ABSTRACT

A graphical user interface that presents document organization in terms of objects readily familiar to the user is provided by the present invention. According to one embodiment of the present invention, a method for managing documents in a computer system includes a step of producing a representation of a document that indicates to the user the contents of the document. A step of associating the representation with the document in the memory of the computer is also part of the method. The method includes a step of displaying a document closet image on the display. The document closet image can include a plurality of document images. A step of selecting a document image from the document closet in response to an input from the user is also part of the method. The method can also include turning the document image selected for display to the user so that the user can readily view the representation of the document's contents.

28 Claims, 8 Drawing Sheets

U.S. PATENT DOCUMENTS

| | | | |
|---|---|---|---|
| 5,392,387 A * | 2/1995 | Fitzpatrick et al. | 715/776 |
| 5,404,295 A | 4/1995 | Katz et al. | |
| 5,418,948 A | 5/1995 | Turtle | |
| 5,479,600 A | 12/1995 | Wroblewski et al. | |
| 5,596,700 A | 1/1997 | Darnell et al. | |
| 5,638,543 A | 6/1997 | Pedersen et al. | |
| 5,680,558 A * | 10/1997 | Hatanaka et al. | 345/838 |
| 5,680,636 A | 10/1997 | Levine et al. | |
| 5,694,559 A | 12/1997 | Hobson et al. | |
| 5,737,599 A | 4/1998 | Rowe et al. | |
| 5,748,805 A | 5/1998 | Withgott et al. | |
| 5,754,179 A * | 5/1998 | Hocker et al. | 345/835 |
| 5,754,809 A * | 5/1998 | Gandre | 715/782 |
| 5,778,397 A | 7/1998 | Kupiec et al. | |
| 5,781,785 A | 7/1998 | Rowe et al. | |
| 5,784,616 A | 7/1998 | Horvitz | |
| 5,819,301 A | 10/1998 | Rowe et al. | |
| 5,838,320 A * | 11/1998 | Matthews, III et al. | 715/786 |
| 5,847,709 A * | 12/1998 | Card et al. | 715/850 |
| 5,857,185 A | 1/1999 | Yamaura | |
| 5,860,074 A | 1/1999 | Rowe et al. | |
| 5,870,770 A | 2/1999 | Wolfe | |
| 5,873,107 A | 2/1999 | Borovoy et al. | |
| 5,880,733 A * | 3/1999 | Horvitz et al. | 715/850 |
| 5,893,908 A * | 4/1999 | Cullen et al. | 707/5 |
| 5,946,678 A | 8/1999 | Aalbersgerg | |
| 5,950,187 A | 9/1999 | Tsuda | |
| 5,982,369 A * | 11/1999 | Sciammarella et al. | 715/835 |
| 6,006,218 A | 12/1999 | Breese et al. | |
| 6,021,403 A | 2/2000 | Horvitz et al. | |
| 6,028,601 A | 2/2000 | Machiraju et al. | |
| 6,182,090 B1 | 1/2001 | Peairs | |
| 6,300,967 B1 * | 10/2001 | Wagner et al. | 715/784 |
| 6,333,752 B1 * | 12/2001 | Hasegawa et al. | 715/764 |
| 6,976,225 B2 * | 12/2005 | Ho | 715/776 |
| 2005/0210378 A1 * | 9/2005 | Schumacher et al. | 715/513 |

FOREIGN PATENT DOCUMENTS

| | | |
|---|---|---|
| EP | 0762297 A2 | 3/1997 |
| EP | 0378848 A2 | 10/1997 |
| EP | 0802492 | 10/1997 |
| GB | 2137788 | 10/1984 |
| GB | 2156118 | 10/1985 |
| GB | 2234609 | 6/1991 |
| GB | 2290898 | 10/1996 |
| JP | 04-276821 | 10/1992 |
| JP | 05-204987 | 8/1993 |
| JP | 06-028143 | 2/1994 |
| JP | 07-084746 | 3/1995 |
| JP | 8297677 A | 11/1996 |
| JP | 09-138745 | 5/1997 |
| JP | 11-065806 | 3/1999 |

OTHER PUBLICATIONS

Begole, et al., "Flexible Collaboration Transparency," doc. ID:ncstrl.vatech_cs/TR-98-11, Virginia Polytechnic Institute and Stale University (1998).

Brandow, R., et al., "Automatic Condensation of Electronic Publications by Sentence Selection," Information Processing & Management, vol. 31. No. (5):pp. 675-685, (1995).

Byrd, D., "A Scrollbar-Based Visualization for Document Navigation," doc. ID:xxx.cs.IR/9902028, Computing Research Repository: Information Retrieval (1999).

"Flexible JAMM Screenshots," downloaded from Internet site http://simon.cs.ct.edu/-jamm May 4, 2000.

Schweighofer, E. et al., "The Automatic Generation of Hypertext Links," Database and Expert Systems Applications, 7th Int'l. Conference, DEXA '96 Proceedings, pp. 889-898, Springer-Verlag, Berlin, Germany (1996).

Sumita, K., et al., "Document Structure Extraction for Interactive Document Retrieval Systems," Conference Proceedings, SIGNDOC '93, 11th Annual Int'l., Conference, pp. 301-310, New York, NY 1993.

Taghva, K., et al., "An Evaluation of an Automatic Markup System." Proceedings of the SPIE, vol. 2422, pp. 317-327, USA (1995).

* cited by examiner

METHOD AND SYSTEM FOR ORGANIZING DOCUMENT INFORMATION

CROSS REFERENCE TO RELATED APPLICATIONS

This application incorporates by reference the following commonly owned co-pending U.S. patent application in its entirety for all purposes:

U.S. patent application Ser. No. 08/995,616, Entitled, "AUTOMATIC ADAPTIVE DOCUMENT HELP SYSTEM."

This application is a divisional of and claims priority to U.S. application No. 09/274,829, filed Mar. 23, 1999, the entire contents of which are herein incorporated by reference for all purposes.

BACKGROUND OF THE INVENTION

The present invention relates generally to user interfaces in computer systems and more particularly to a graphical user interface method and apparatus for assisting a user with the tasks of organizing and locating documents.

Increasingly, readers of documents are being called upon to assimilate vast quantities of information in a short period of time. Documents are becoming more widely available in electronic form. Some documents are available electronically by virtue of their having been created using word processing software. Other electronic documents are accessible via the Internet. Yet others may become available in electronic form by virtue of being scanned in, copied or faxed. Typical documents can contain text, data, scanned images, applications, executable code, sounds, movies and so forth. Today's computing systems are becoming tools for organizing and manipulating documents. To facilitate this use, the user must be able to store and retrieve such documents quickly and efficiently. Naturally, this task becomes more complicated when the number of documents is large and the types of documents are varied.

Recently, the graphical user interface (GUI) has provided a more efficient way for the user to organize documents. As will be described below however, current GUIs have drawbacks that restrict the user's flexibility and ability to perform tasks efficiently.

FIG. 1A illustrates a typical graphical user interface for manipulating documents. FIG. 1A illustrates a partial screen display 10 of a Macintosh computer running the System 7 operating system, both from Apple Computer, Inc. Screen display 10 includes a cursor 20, icons representing folders such as System Folder 30, Word 40 and System 50, windows such as windows 60 and 70, document icons such as text file 80, file 90, and font 100.

A user operates the graphical user interface by typically using a mouse, or other pointing device, to control a cursor, shown at 20, to select, or "click on," icons such as System Folder 30 in a manner well-known in the art. Here, when System Folder 30 has been selected, window 60 appears on screen display 10. Window 60 includes additional icons in the shape of folders, such as System 50, and documents such as document 90. When the user clicks on System 50, window 70 appears. As shown, Window 70 includes documents representing type faces such as font 100.

Icons, representing folders or documents, may be moved within the various windows by clicking upon a particular icon, dragging the icon to a destination window, and dropping the icon in the destination window. For example, text file 80 can be moved into Word 40 folder by clicking on text file 80 icon, dragging text file 80 icon on top of Word 40 folder, and dropping text file 80 icon on top of Word 40 folder.

Under the Macintosh operating system, icons can be in the shape of folders or documents, etc. The shapes of icons are often used to help the user organize documents. The operating system also allows icons to be labeled with a name, typically immediately below the icon, as well as to have different shapes, and to have additional ornamentation. These techniques provide the user with a visual indication of what the icon represents.

One drawback of the Macintosh operating system is that icons can be arbitrarily positioned on the screen. When there are many icons on the screen, often the screen becomes cluttered and is difficult to read.

Another drawback is that the operating system allows the user to arbitrarily place icons in virtually any window. As illustrated in FIG. 1A, window 60 and screen display 10 contain folders, documents and other icons all together, making it difficult for the user to conceptualize a document hierarchy. Because the operating system uses a scheme that is different from the way users typically use and organize documents, the scheme is not intuitive to users, especially novice users.

FIGS. 1B and 1C illustrates another typical graphical user interface for manipulating documents. FIGS. 1B and 1C illustrate a partial screen display 120 and 130 under Microsoft Windows 3.1 by Microsoft, Inc.

In FIG. 1B, screen display 120 includes windows such as window 140 and icons such as icon 150 and 160. Under Microsoft Windows, icons have a generic "menu" depictions such as icon 150, although custom icons can also be used. Here window 140 includes icons including a file cabinet icon 160. The function associated with file cabinet icon 160 allows the user to manipulate and organize files under Windows 3.1.

In FIG. 1C, a partial screen display 130 is presented to the user in response to the selection of file cabinet icon 160 of FIG. 1B. Partial screen display 130 includes a left portion 180, a right portion 190, open folder 200 icon, folder icon 210, and document icon 220.

Left portion 180 illustrates file folders in a directory "tree" structure; and the right portion 190 illustrates the contents of a selected file folder 200 in left portion 180. When selected, the selected folder icon is highlighted and open folder 200 icon replaces the original icon. The contents of open folder 200 icon are shown in right portion 190 and include folders such as images 210 and documents such as pcbkmark.zip 220.

Drawbacks of the Microsoft Windows 3.1 user interface are similar to the drawbacks of the Macintosh user interface. Specifically, since icons can be arbitrarily positioned on the screen, when there are many icons on the screen, often the screen becomes cluttered and is difficult to read. Further, as illustrated in FIG. 1C, windows can contain a mix of folders, documents and other icons all together, making it difficult for the user to conceptualize a document hierarchy. Other interfaces, such as the OS/2 Presentation Manager, from IBM Corporation and the Microsoft Windows 95 user interface have similar drawbacks to the Macintosh system. Again, because the operating system uses a scheme that is different from users' everyday experiences, the scheme is not intuitive to users, especially novice users.

Other approaches to the problem of organizing documents exist. For example, tools exist to search for documents both on the Internet and locally based upon content. Once a document is identified and retrieved, automatic summarization techniques, such as the Reader's Helper™ help the reader to find as well as assimilate the information he or she wants more quickly. The Reader's Helper is described in a commonly owned co-pending U.S. patent application No. 08/995,616, entitled AUTOMATIC ADAPTIVE DOCUMENT HELP SYSTEM, the contents of which are incorporated herein by reference for all purposes.

While efforts to create personal agents for reading online documents represent significant contributions to the field in their own right, many readers continue to seek easier ways to organize and locate documents of interest. What is needed is a graphical user interface that provides the user an easy and efficient system for manipulating and organizing documents in a computer system.

SUMMARY OF THE INVENTION

A graphical user interface that presents document organization in terms of objects readily familiar to the user is provided by the present invention. According to one embodiment of the present invention, a method for managing documents in a computer system includes a step of producing a representation of a document that indicates to the user the contents of the document. A step of associating the representation with the document in the memory of the computer is also part of the method. The method includes a step of displaying a metaphorical document closet image on the display. The document closet image can include a plurality of document images. A step of selecting a document image from the document closet in response to an input from the user is also part of the method. The method can also include turning the document image selected for display to the user so that the user can readily view the representation of the document's contents.

Some embodiments can also include the step of displaying at least one of a plurality of concepts of interest to the user. The user can indicate a selection of concepts of interest. The method then highlights at least one document image from the plurality of document images in response to the selection made by the user. The highlighted document image corresponds to a document having content that includes the concept of interest. Embodiments may use color, italics, fonts, audio or pop-up windows to indicate the highlighting.

Select embodiments may also include the step of providing a sliding window in the document image. The sliding window can be scrolled through the document image responsive to input from the user. These embodiments then accept from the user input and move the sliding window through the document image in response. Yet further, some embodiments may also include the step of providing a pop-up window in which the subset of the contents of the document displayed in the sliding window is displayed to the user.

In another aspect of the present invention, an apparatus for managing documents in a computer system is provided. Embodiments of the apparatus can include a memory, a display and a processor. The apparatus is capable of producing a representation of a document in a location in the memory. The apparatus can then associate the representation with the document in the memory. Further, the apparatus can display a document closet image on the display. The document closet image can include a plurality of document images, each document image displaying a representation of the contents of an associated document in memory. The apparatus can then select a document image from the plurality of document images in response to a first signal from the user input device and turn the document image selected for display to a user for viewing the representation of the contents.

In a yet further aspect of the present invention, a computer program product for managing documents in a computer system is provided. The computer program product comprises code for producing a representation of a document in a location in the memory. Further, code for associating the representation with the document in the memory is also included. Code for displaying a document closet image on the display is also included in the computer program product. The document closet image can include a plurality of document images. The document images can display a representation of the contents of an associated document stored in the memory of a computer. The program product can also include code for selecting a document image from the plurality of document images. The selection can be in response to a first signal from a user input device. Code for turning the document image selected for display to the user so that the user can view the document image's representation of the document's contents can also be included.

Numerous benefits are achieved by way of the present invention over conventional techniques. In some embodiments, the present invention is easier to use than conventional graphical user interfaces. The present invention can provide a way to display a large quantity of information about a plurality of documents to the user on a single screen. Some embodiments according to the invention are easier for new users to learn than known techniques. Objects in the user interface resemble physical objects familiar to the user. This can reduce the learning time required by novice users because the user interface is more intuitive. These and other benefits are described throughout the present specification.

A further understanding of the nature and advantages of the inventions herein may be realized by reference to the remaining portions of the specification and the attached drawings.

DESCRIPTION OF THE SPECIFIC EMBODIMENTS

The preferred embodiment of the present invention displays an image of a "document closet" on the display. The document closet image is a metaphor for a physical closet widely used in people's homes for storage of personal belongings, especially articles of clothing. The document closet image typically includes one or more document images in much the same way a physical closet contains physical items of clothing. Other suitable metaphors can be used, such as a file cabinet, bookshelf, desk and the like.

Document images are metaphors for physical documents. The document images are depicted as hanging from a rack in the document closet, reminiscent of items of clothing hanging in a cloths closet. Document images depict a representation of the contents of their corresponding documents. In response to the user selecting a particular document image, the contents of the particular document are turned to face the user in much the same way as a selected article of clothing is made visible by removing it from the rack in the closet and hanging it facing the user. The document content representation can be generated by any number of methods such as frequency analysis techniques, archival programs and the like as known in the art. Preferably, documents contained herein include text or images, however other types of documents are also contemplated, such as moving pictures and sounds.

The organizational scheme of the preferred embodiment of the present invention described below, presents an interface to the user for organizing and manipulating documents in a manner already quite familiar to the user, an ordinary cloths closet. This familiar paradigm will reduce the learning curve for persons new to systems embodying the present invention. Further, the expected increase in efficiency of the user is believed to be high. Additionally, the cloths closet metaphor can be expected to gain wide acceptance with users because the concept of a cloths closet is well familiar to most people.

Figure 1A:
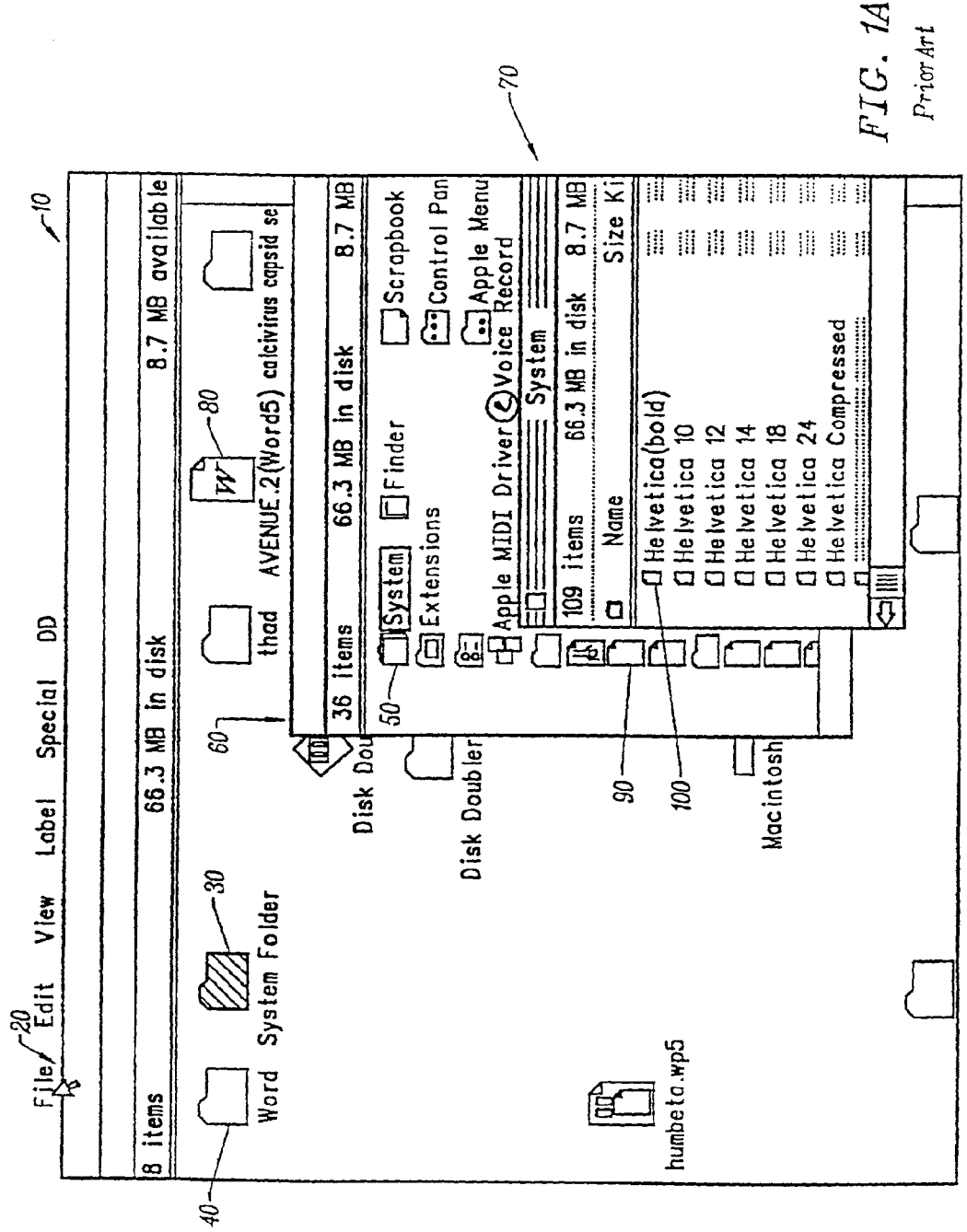
FIG. 1A illustrates a typical graphical user interface for manipulating documents.
Figure 1B:
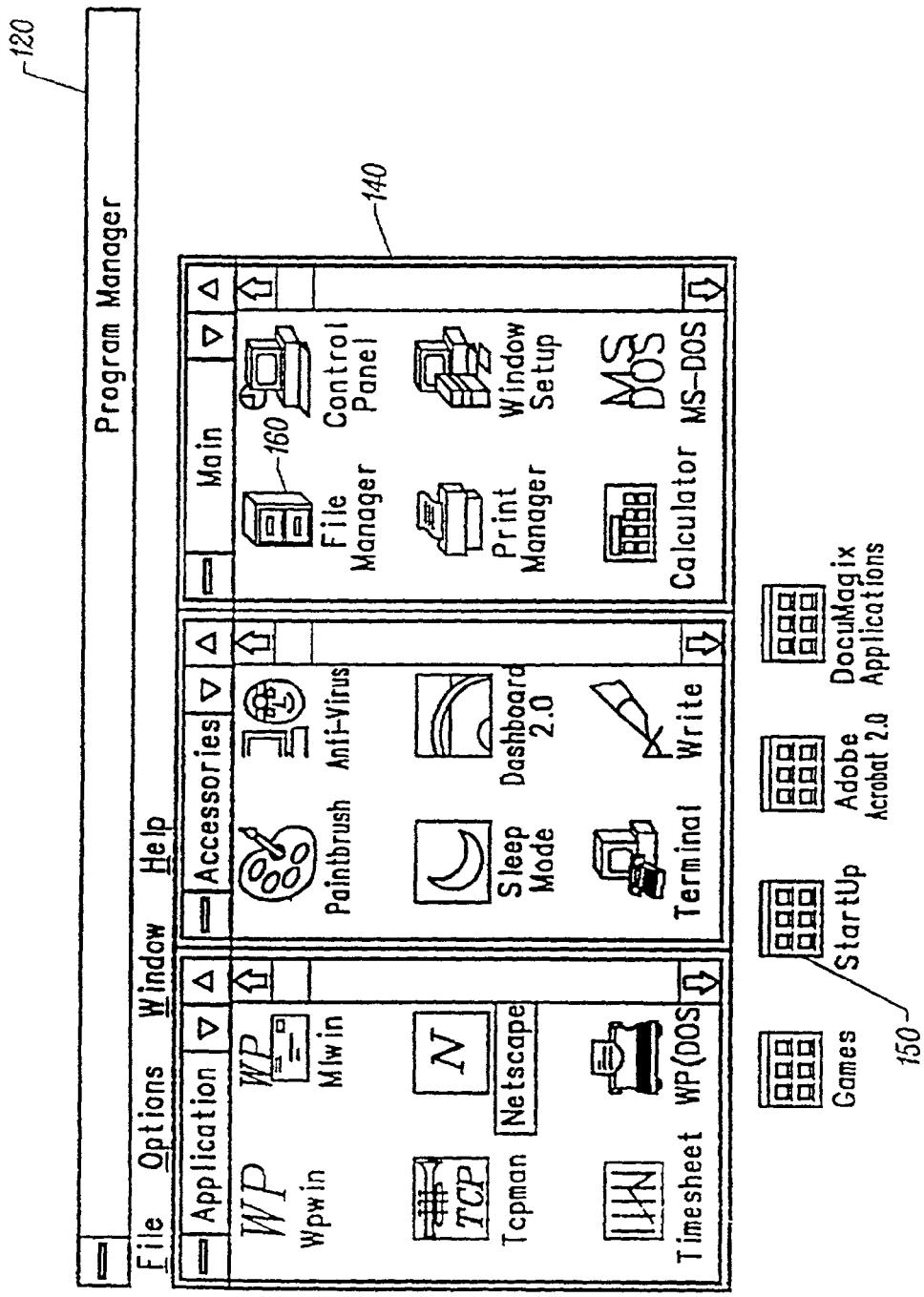
FIGS. 1B and 1C illustrates another typical graphical user interface for manipulating documents.
Figure 1C:
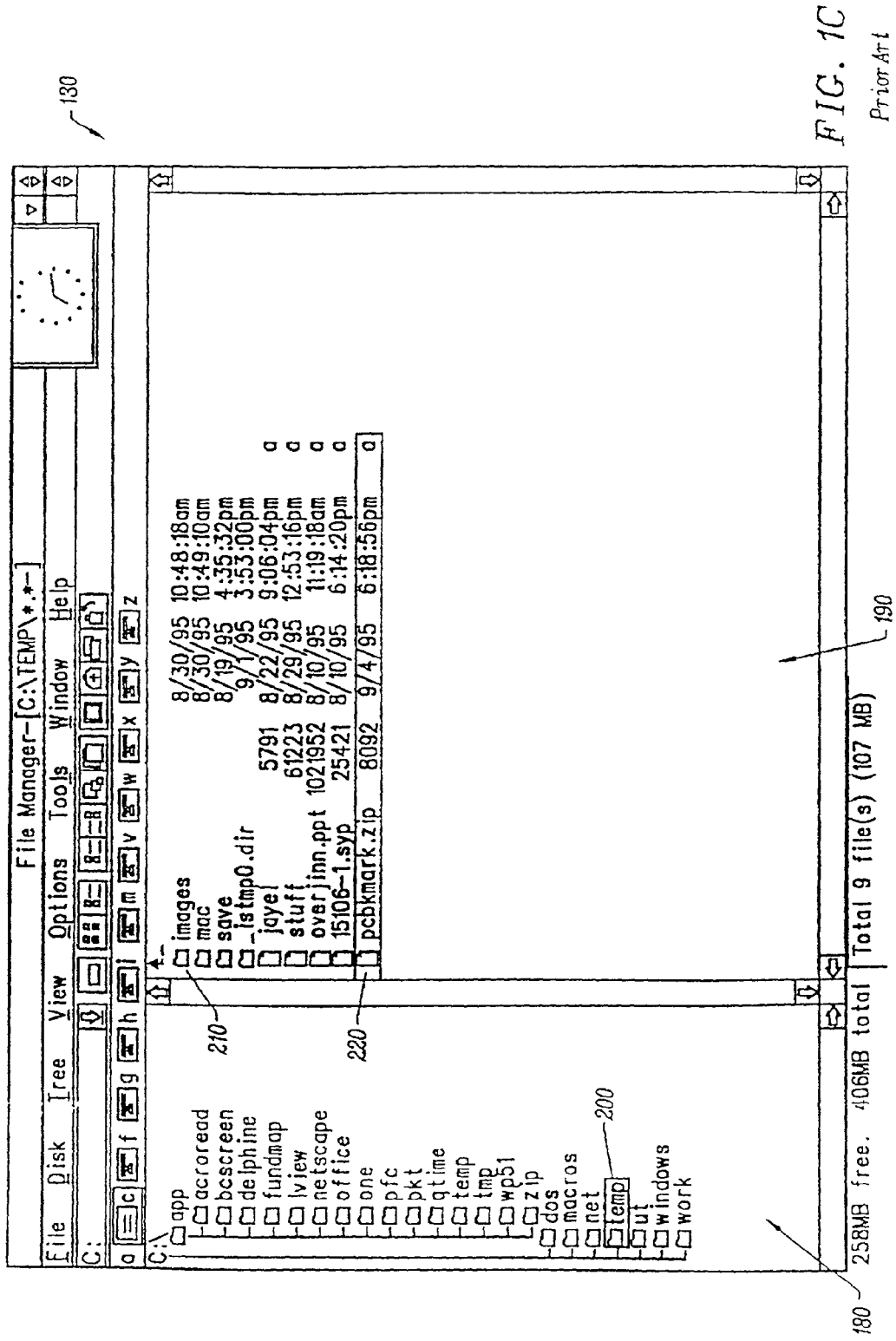
Figure 2:
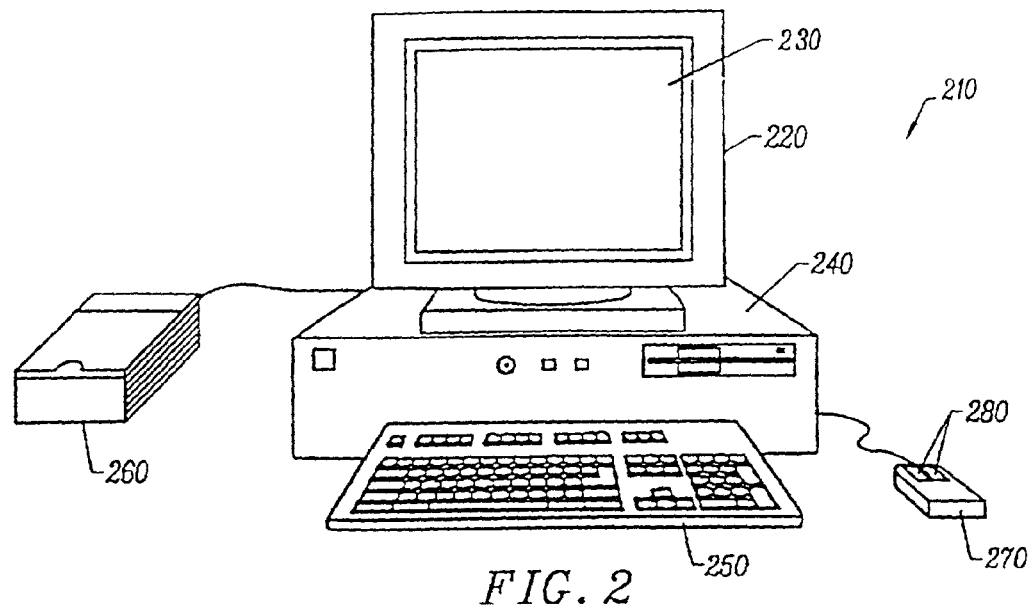
FIG. 2 is an illustration of a system according to an embodiment of the present invention.

FIG. 2 is an illustration of a system according to a preferred embodiment of the present invention. FIG. 2 depicts but one example of many possible computer types or configurations capable of being used with the present invention and should not limit the scope of the claims herein. One of ordinary skill in the art would recognize other variations, modifications, and alternatives. FIG. 2 shows computer system 210 including display device 220, display screen 230, cabinet 240, keyboard 250, a scanner 260, and mouse 270. Mouse 270 and keyboard 250 illustrate "user input devices." Other examples of user input devices are a touch screen, light pen, track ball, data glove, etc.

In a preferred embodiment, System 1 includes a Pentium® class based computer, running Windows NT™ operating system. However, the methods according to the present invention can also be embodied in other operating systems, such as MacOS™ OS/2™, Windows™ and Linux™ without departing from the scope of the present invention.

Mouse 270 may have one or more buttons such as buttons 280. Cabinet 240 houses familiar computer components such as disk drives, a processor, storage means, etc. As used in this specification "storage means" includes any storage device used in connection with a computer system such as disk drives, magnetic tape, solid state memory, bubble memory, etc. Cabinet 240 may include additional hardware such as input/output (I/O) interface cards for connecting computer system 210 to external devices such as a scanner 260, external storage, other computers or additional peripherals.

FIG. 2 is representative of but one type of system for embodying the present invention. Embodiments may not have all of the components described, or can have additional components or different arrangements of components. It will be readily apparent to one of ordinary skill in the art that many system types and configurations are suitable for use in conjunction with the present invention.

Figure 3:
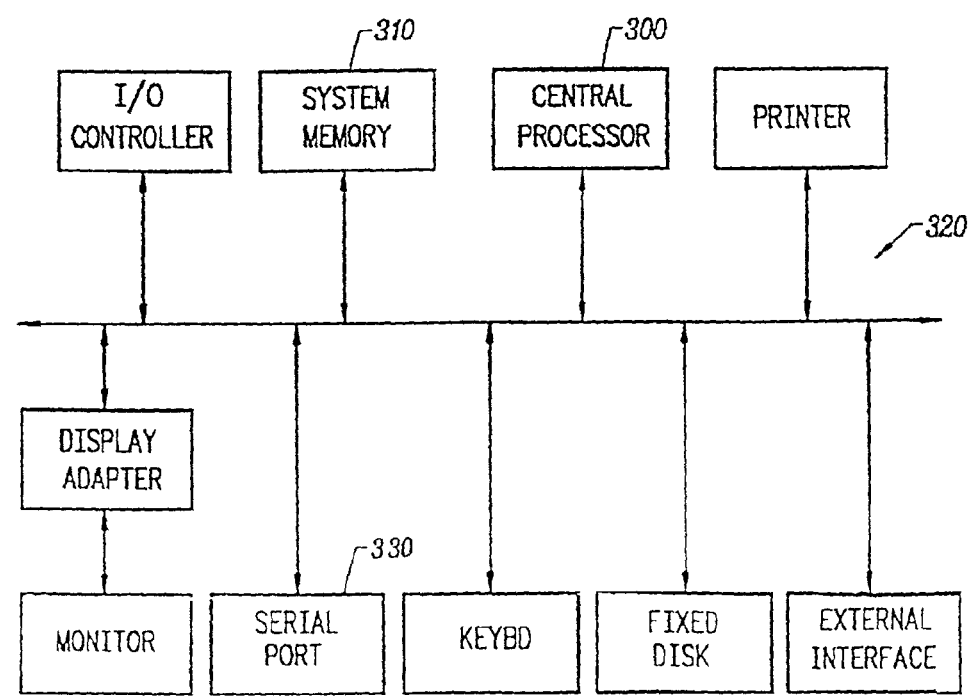
FIG. 3 is an illustration of basic subsystems of the system of FIG. 2.

FIG. 3 is an illustration of basic subsystems in computer system 210 of FIG. 2. FIG. 3 is merely an illustration and should not limit the scope of the claims herein. One of ordinary skill in the art would recognize other variations, modifications, and alternatives. In FIG. 3, subsystems are represented by blocks such as central processor 300, system memory 310, etc. Embodiments may not have all of the subsystems described, or can have additional subsystems or different arrangements of subsystems. The subsystems are interconnected via a system bus 320. Additional subsystems such as a printer, keyboard, fixed disk and others are shown. Peripherals and input/output (I/O) devices can be connected to the computer system by, for example serial port 330. Serial port 330 can be used to connect the computer system to a modem, a mouse input device, or a scanner, for example. The interconnection via system bus 320 allows central processor 300 to communicate with each subsystem and to control the execution of instructions from system memory 310 or the fixed disk, and the exchange of information between subsystems. Other arrangements of subsystems and interconnections are possible. System Memory 310, and the fixed disk are examples of tangible media for storage of computer programs, other types of tangible media include floppy disks, removable hard disks, optical storage media such as CD-ROMS and bar codes, and semiconductor memories such as flash memory, read-only-memories (ROM), and battery backed memory.

Figure 4:
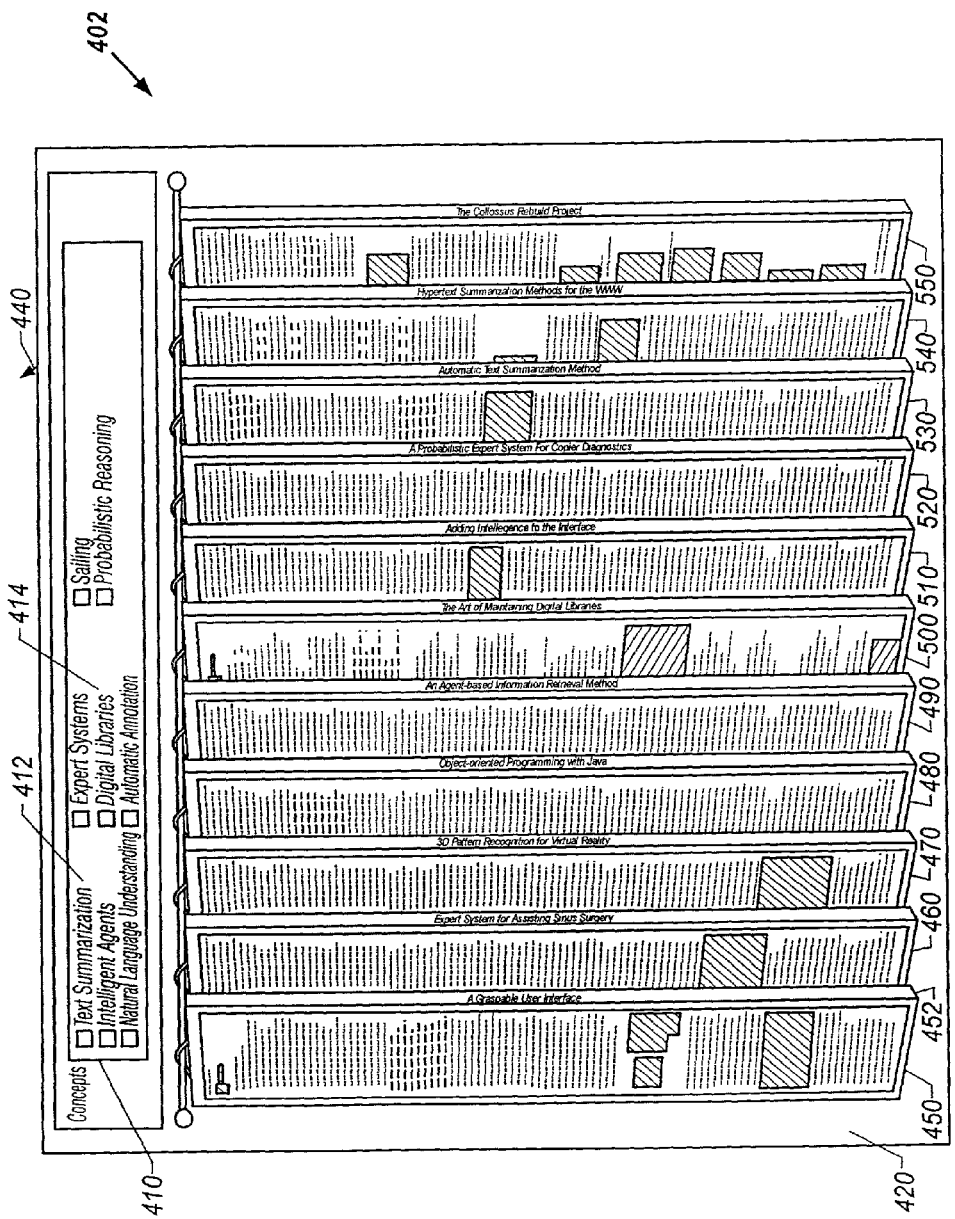
FIGS. 4-7 illustrate screen displays according to an embodiment of the present invention.

FIG. 4 illustrates a document closet 402 which can be displayed on display screen 230 of FIG. 2, according to a preferred embodiment of the present invention. FIG. 4 is merely an illustration and should not limit the scope of the claims herein. One of ordinary skill in the art would recognize other variations, modifications, and alternatives. Document closet 402 includes a viewable document closet area 420 having one or more document images, such as document images 450-550, each having a representation of the content of an associated document. Each document image can include a text title field on the edge of the document image visible to the user. For example, document image 450, includes text field 452 having a title "A Graspable User Interface." Some embodiments can have a concept indicator bar, such as concept indicator bar 410 that includes a plurality of concept indicators, such as concept indicator 412, that corresponds to concept "text summarization" and concept indicator 414, that corresponds to concept "digital libraries." In these embodiments, selecting one or more particular concept indicators causes document images corresponding to documents with content relevant to the selected concept indicator to be displayed. A concept indicator is not necessary to practice the invention, however. Some embodiments can also include items such as a menu bar, a status bar, one or more tool bar buttons, a horizontal scroll bar and a vertical scroll bar without departing from the scope of the present invention.

A cursor 440 is manipulated by the mouse (not shown) or other pointing device to select, position, activate and otherwise manipulate the images on the screen. As illustrated in FIG. 4, document images 450-550 are displayed in a viewable portion 420 of the document closet 402. Other document images may exist and may be displayed to the user through conventional scrolling of the visible portion 420. As described, the document closet and each of the document images 450-550 are metaphors that provide an easy and intuitive way for users to manipulate documents in the computer system. Other suitable metaphors can be used, such as a file cabinet, bookshelf, desk and the like. The presently preferred embodiment of the invention contemplates any number of document images.

Figure 5:
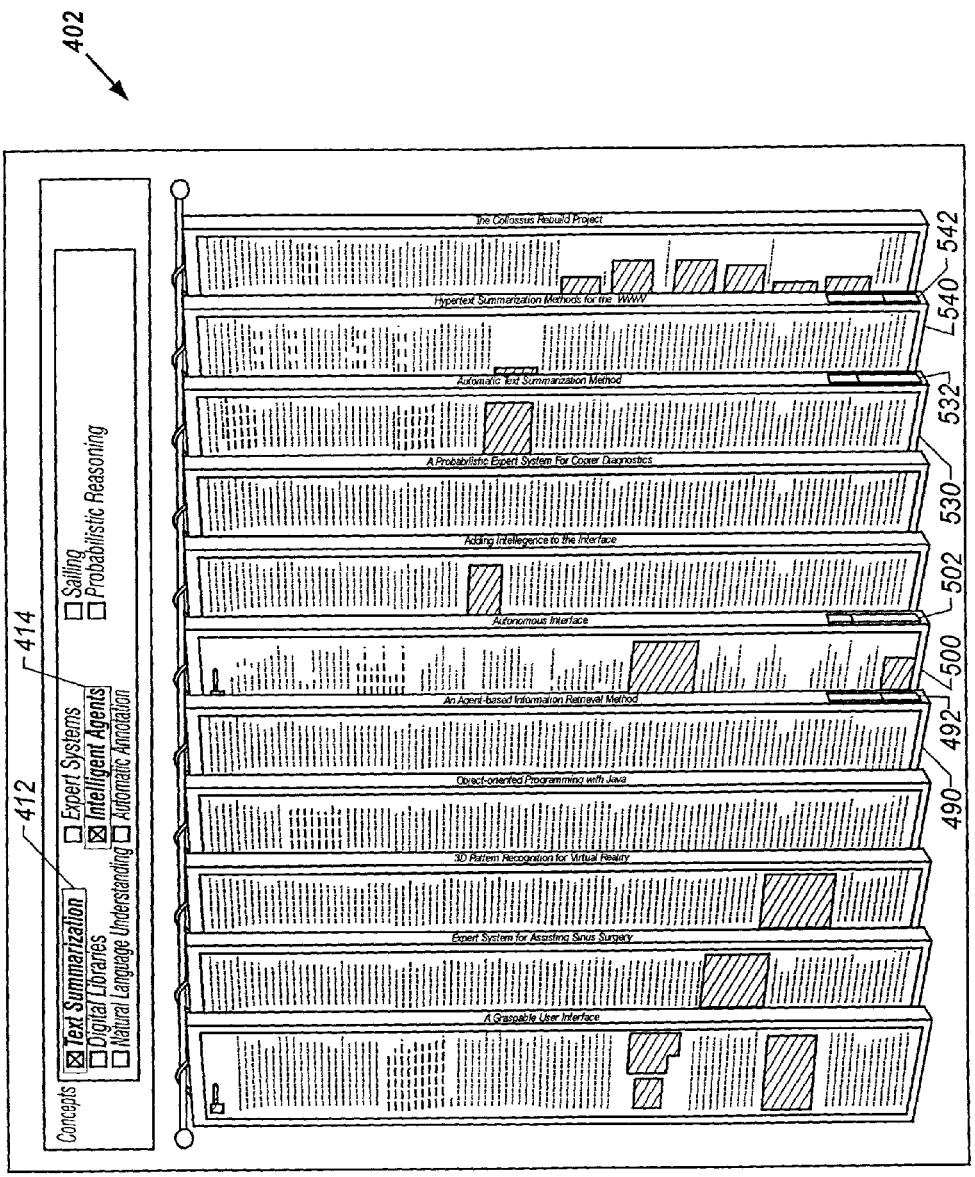

FIG. 5 illustrates a document closet, such as document closet 402 of FIG. 4, or other embodiments according to the present invention. FIG. 5 is merely an illustration and should not limit the scope of the claims herein. One of ordinary skill in the art would recognize other variations, modifications, and alternatives. FIG. 5 shows document images 490, 500 and 530, 540 highlighted responsive to a user having selected one or more concept indicators in a concept indicator bar, such as concept indicator bar 410, using a mouse or other pointing device (not shown). Here, the user has selected concept indicator 412, corresponding to the concept "text summarization" and concept indicator 414, corresponding to the concept "digital libraries." In response, the document images 490 and 500 are highlighted in the same manner as concept indicator 412 to indicate that a concept corresponding to concept indicator 412 is included in the documents corresponding to document images 490 and 500. Further, a graphical indicator of relevancy 492 is displayed on the edge of document image 490 to indicate the relevance of the document entitled, "An Agent Based Information Retrieval Method," corresponding to document image 490, to the concept of "text summarization" corresponding to concept indicator 412. Similarly, a graphical indicator of relevancy 502 is displayed on the edge of document image 500 to indicate the relevance of a document entitled, "Autonomous Interface Agents," corresponding to document image 500, to a concept of "text summarization" corresponding to concept indicator 412. Analogously, graphical indicators of relevancy 532 and 542 are displayed on the edges of document images 530 and 540 respectively, to indicate the relevance of documents corresponding to these document images to a concept of "intelligent agents" corresponding to concept indicator 414. Graphical indicators of relevancy in the presently preferred embodiment can be provided by a Bayesian Network technique described in U.S. patent application Ser. No. 08/995,616, entitled, "AUTOMATIC ADAPTIVE DOCUMENT HELP SYSTEM," which is incorporated herein by reference in its entirety for all purposes. Other methods of determining relevancy known in the art, such as frequency analysis and the like could also be used in select embodiments according to the present invention.

Select embodiments can use variations in color to provide the highlighting described above. For example, document images 490 and 500 could be colored, for example, orange by the system to indicate their relationship with concept indicator 412, which would also be colored orange. Similarly, document images 530 and 540 and corresponding concept indicator 414 could all be colored green, for example, to indicate their relationship. Choice of colors is arbitrary and other color schemes or highlighting could be used.

Figure 6:
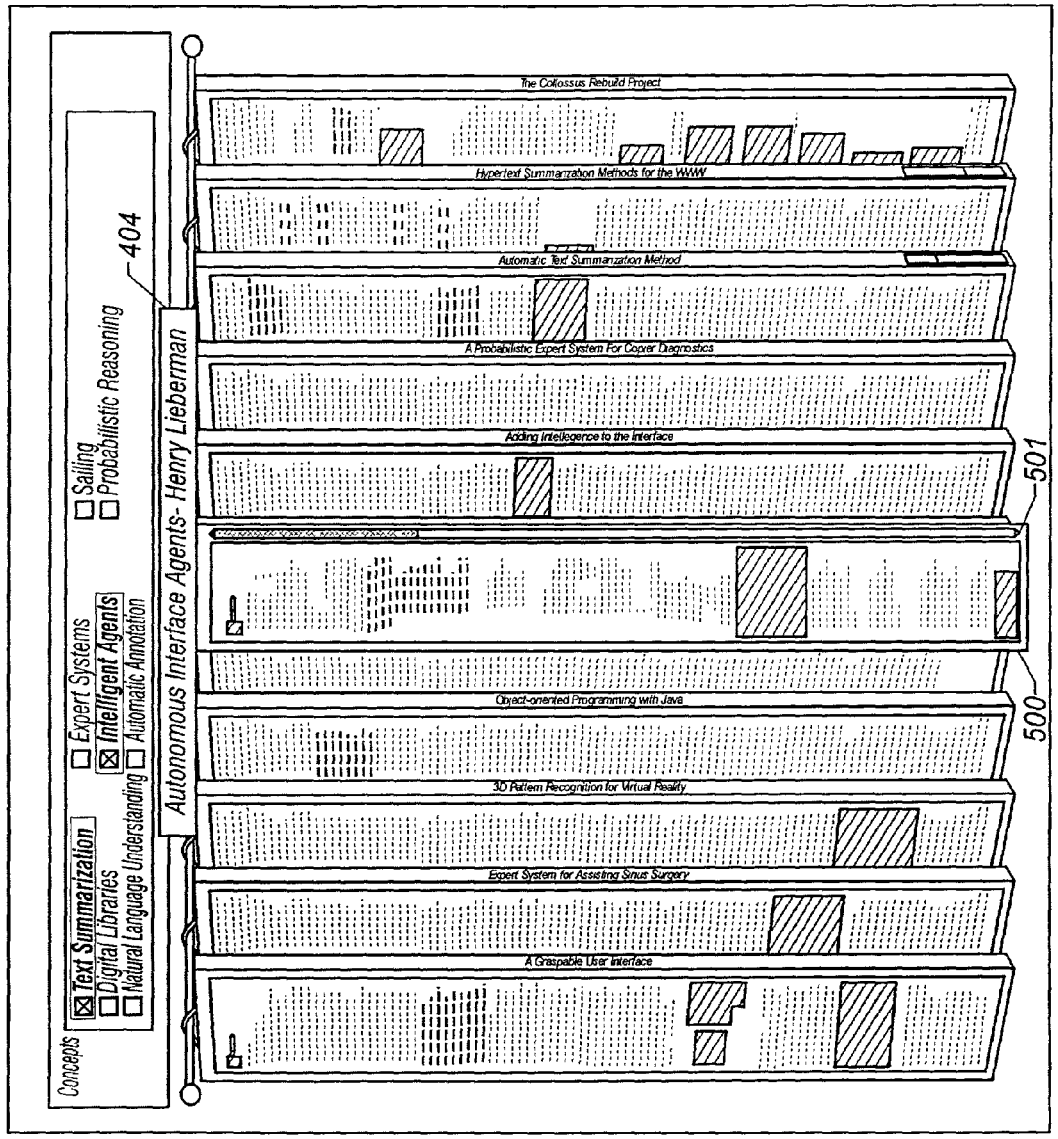
Figure 7:
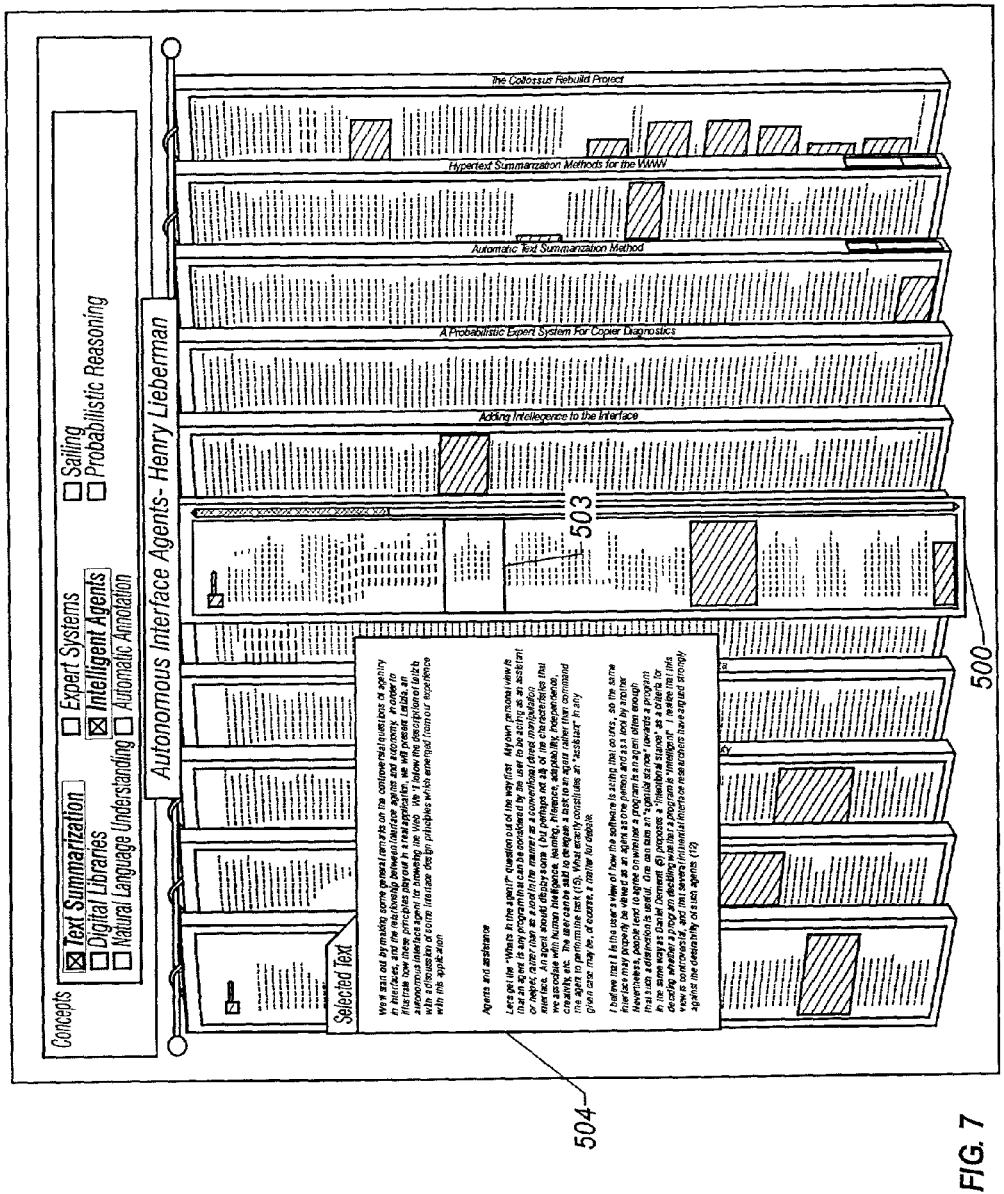

FIGS. 6-7 illustrate accessing a document in a document closet in one embodiment according to the present invention. FIG. 6 is merely an illustration and should not limit the scope of the claims herein. One of ordinary skill in the art would recognize other variations, modifications, and alternatives. In FIG. 6, a user has selected document image 500 using a mouse or other pointing device (not shown). In response, document image 500 is depicted rotated to face the user. A scroll bar 501 is added to the edge of the document image 500. A title bar 404 displaying the title of the document, "Autonomous Interface Agents" corresponding to document image 500 appears near the top of the document closet in FIG. 6.

FIG. 7 illustrates the capability in some embodiments according to the present invention to view contents of the document using a sliding window 503 and a "pop-up" window 504. FIG. 7 is merely an illustration and should not limit the scope of the claims herein. One of ordinary skill in the art would recognize other variations, modifications, and alternatives. Using the mouse or pointing device, a user moves sliding window 503 down the document image of interest, in this case document image 500. Portions of the content of the document corresponding to the part of the document image contained within sliding window 503 appear in the pop-up window 504. Other mechanisms can be used in place of sliding window 503 and pop-up window 504 to draw attention to a particular section of text, such as a pointer or other icon responsive to input from the mouse or other pointing device, highlighting or emphasizing text responsive to input from the mouse, and the like.

Conclusion

In the foregoing specification, the invention has been described with reference to a specific exemplary embodiments thereof. Many changes or modifications are readily envisioned. For example, changing the size or arrangement of the documents in the document closet, changing the appearance and features of document images; adding audio effects when manipulating the document closet or the document images, etc.; adding audio memos describing the contents of the document closet or the document images, among other changes, are included within other embodiments of the present invention.

The specification and drawings are, accordingly, to be regarded in an illustrative rather than in a restrictive sense. It will, however, be evident that various modifications and changes may be made thereunto without departing from the broader spirit and scope of the invention as set forth in the claims.

What is claimed is:

1. A computer-implemented method of managing a plurality of documents, the method comprising:
    generating for display a graphical user interface (GUI) containing a document viewing region;
    generating for display a plurality of first document images in the document viewing region, each first document image showing a first view of at least a portion of contents of a respective document in a plurality of documents, the selection of one of said first document images causing a second document image to be displayed at approximately the location of the first view in the document viewing region such that substantially only a second view of the selected document is displayed, the second document image corresponding to the contents of the entire respective document and showing the second view of a portion of contents of the respective document, the second document image having associated therewith a scrolling mechanism configured to allow a user to scroll through any contents of the second document image not initially shown in the second view;
    generating for display a set of predetermined concepts in the GUI, each of the plurality of documents relating to at least one of a plurality of possible concepts;
    analyzing each word contained within a user-readable portion of each of the plurality of documents to determine a level of relevance of each document with respect to each of the set of predetermined concepts; and
    in response to receiving a selection of a first predetermined concept from the set of predetermined concepts:
    displaying a relevancy indicator for each first document image displayed in the document viewing region where the document associated with that first document image is determined to be relevant to the selected predetermined concept, at least one aspect of the relevancy indicator being determined at least in part by the determined level of relevance of the associated document;
    wherein the second document image is displayed that is determined to be relevant to the selected predetermined concept, highlighting at least part of a user-readable portion of the second document image that includes at least one word determined to be relevant to the selected first predetermined concept; and
    wherein the document viewing region is a document closet image.

2. The method of claim 1 further comprising:
    receiving a first signal specifying the selection of a first document image from the plurality of first document images; and
    configuring the second document image so that the contents are displayed face up in the second view.

3. The method of claim 2 further comprising:
    displaying a sliding window covering a first area of the second document image, the sliding window capable of being moved along the second document image; and displaying contents of the document corresponding to the first area in a content viewing area of the document viewing region.

4. The method of claim 3 further comprising:
receiving a second signal;
moving the sliding window from the first area of the second document image to a second area of the second document image in response to the second signal; and
displaying contents of the document corresponding to the second area in the content viewing area of the document viewing region.

5. The method of claim 1, wherein each first document image further comprises a title of the respective document whose contents are displayed.

6. A computer program product stored on a computer readable storage medium for managing a plurality of documents, the computer program product comprising:
code for displaying a graphical user interface (GUI) containing a document viewing region;
code for displaying a plurality of first document images in the document viewing region, each first document image showing a first view of at least a portion of contents of a respective document in a plurality of documents, the selection of one of said first document images causing a second document image to be displayed at approximately the location of the first view in the document viewing region such that substantially only a second view of the selected document is displayed, the second document image corresponding to the contents of the entire respective document and showing the second view of a portion of contents of the respective document, the second document image having associated therewith a scrolling mechanism configured to allow a user to scroll through any contents of the second document image not initially shown in the second view;
code for displaying a set of predetermined concepts in the GUI, each of the plurality of documents relating to at least one of a plurality of possible concepts;
code for analyzing each word contained within a user-readable portion of each of the plurality of documents to determine a level of relevance of each document with respect to each of the set of predetermined concepts; and
code for, in response to receiving a selection of a first predetermined concept from the set of predetermined concepts:
displaying a relevancy indicator for each first document image displayed in the document viewing region where the document associated with that first document image is determined to be relevant to the selected predetermined concept, at least one aspect of the relevancy indicator being determined at least in part by the determined level of relevance of the associated document;
where the second document image is displayed that is determined to be relevant to the selected predetermined concept, highlighting at least part of a user-readable portion of the second document image that includes at least one word determined to be relevant to the selected first predetermined concept; and
wherein the document viewing region is a document closet image.

7. The computer program product of claim 6 further comprising:
code for receiving a first signal specifying the selection of a first document image from the plurality of first document images; and
code for configuring the second document image so that the contents are displayed face up in the second view.

8. The computer program product of claim 7 further comprising:
code for displaying a sliding window covering a first area of the second document image, the sliding window capable of being moved along the second document image; and
code for displaying contents of the document corresponding to the first area in a content viewing area of the document viewing region.

9. The computer program product of claim 8 further comprising:
code for receiving a second signal;
code for moving the sliding window from the first area of the second document image to a second area of the second document image in response to the second signal; and
code for displaying contents of the document corresponding to the second area in the content viewing area of the document viewing region.

10. The computer program product of claim 6, wherein the first document image further comprises a title of the respective document whose contents are displayed.

11. An apparatus for managing documents in a computer system, the apparatus comprising:
a memory;
a display;
a user input device, and
a processor operatively disposed to:
display a graphical user interface (GUI) on the display, the GUI containing a document viewing region;
display a plurality of first document images in the document viewing region, each first document image showing a first view of at least a portion of contents of a respective document in a plurality of documents, the selection of one of said first document images causing a second document image to be displayed at approximately the location of the first view in the document viewing region such that substantially only a second view of the selected document is displayed, the second document image corresponding to the contents of the entire respective document and showing the second view of a portion of contents of the respective document, the second document image having associated therewith a scrolling mechanism configured to allow a user to scroll through any contents of the second document image not initially shown in the second view;
display a set of predetermined concepts in the GUI, each of the plurality of documents relating to at least one of a plurality of possible concepts;
analyze words contained within a user-readable portion of each of the plurality of documents to determine a level of relevance of each document with respect to each of the set of predetermined concepts; and
in response to receiving a selection of a first predetermined concept from the set of predetermined concepts:
display a relevancy indicator for each first document image displayed in the document viewing region where the document associated with that first document image is determined to be relevant to the selected predetermined concept, at least one aspect of the relevancy indicator being determined at least in part by the determined level of relevance of the associated document;
wherein the second document image is displayed that is determined to be relevant to the selected predetermined concept, highlight at least part of a user-readable portion of the second document image that includes at least one word determined to be relevant to the selected first predetermined concept; and wherein the document viewing region is a document closet image.

12. The apparatus of claim 11 wherein the process is operatively disposed to:
select a first document image from the plurality of first document images in response to a first signal; and
configure the second document image so that the contents are displayed face up in the second view.

13. The apparatus of claim 11, wherein the first document image further comprises a title of the respective document whose contents are displayed.

14. A computer system for managing documents, the computer system comprising:
a machine configured to display a graphical user interface (GUI) on a display, the GUI containing a document viewing region;
a machine configured to display a plurality of first document images in the document viewing region, each first document image showing a first view of at least a portion of contents of a respective document in a plurality of documents, the selection of one of said first document images causing a second document image to be displayed at approximately the location of the first view in the document viewing region such that substantially only a second view of the selected document is displayed, the second document image corresponding to the contents of the entire respective document and showing the second view of a portion of contents of the respective document, the second document image having associated therewith a scrolling mechanism configured to allow a user to scroll through any contents of the second document image not initially shown in the second view;
a machine configured to display a set of predetermined concepts in the GUI, each of the plurality of documents including text relating to at least one of a plurality of possible concepts;
a machine configured to analyze words contained within a user-readable portion of each of the plurality of documents to determine a level of relevance of each document with respect to each of the set of predetermined concepts; and
a machine configured to, in response to receiving a selection of a first predetermined concept from the set of predetermined concepts:
display a relevancy indicator for each first document image displayed in the document viewing region where the document associated with that first document image is determined to be relevant to the selected predetermined concept, at least one aspect of the relevancy indicator being determined at least in part by the determined level of relevance of the associated document;
where the second document image is displayed that is determined to be relevant to the selected predetermined concept, highlight at least part of a user-readable portion of the second document image that includes at least one word determined to be relevant to the selected first predetermined concept; and
wherein the document viewing region is a document closet image.

15. The computer system of claim 14 further comprising:
a machine configured to select a first document image from the plurality of first document images in response to a first signal; and
a machine configured to present the second document image so that the contents are displayed face up in the second view.

16. The computer system of claim 15 further comprising:
a machine configured to display a sliding window covering a first area of the second document image, the sliding window capable of being moved along the second document image; and
a machine configured to display contents of the document corresponding to the first area in a content viewing area of the document viewing region.

17. The computer system of claim 16 further comprising:
a machine configured to receive a second signal;
a machine configured to move the sliding window from the first area of the second document image to a second area of the second document image in response to the second signal; and
a machine configured to display contents of the document corresponding to the second area in the content viewing area of the document viewing region.

18. The computer system of claim 14, wherein the first document image further comprises a title of the respective document whose contents are displayed.

19. A method of managing a plurality of documents, the method comprising:
generating for display a graphical user interface (GUI) on a display, the GUI containing a document viewing region;
generating for display a plurality of first document images in the document viewing region, each first document image showing a first view of at least a portion of contents of a respective document in a plurality of documents, the first view showing the portion being oriented in a first slanted orientation;
generating a second document image corresponding to the entire respective document and showing a second view of the portion of contents in response to the selection of the first document image, the second view displaying the portion in a face up orientation, wherein the displayed portion of the second document image is not covered by any other document image and is visible to a user, wherein the second document image covers a portion of at least one first document image when displaying the second view, and wherein the second document image has associated therewith a scrolling mechanism configured to allow a user to scroll through any contents of the second document image not initially shown in the second view;
generating for display a set of predetermined concepts in the GUI, each of the plurality of documents relating to at least one of a plurality of possible concepts;
analyzing words contained within a user-readable portion of each of the plurality of documents to determine a level of relevance of each document with respect to each of the set of predetermined concepts; and
in response to receiving a selection of a first predetermined concept from the set of predetermined concepts:
displaying a relevancy indicator for each first document image displayed in the document viewing region where the document associated with that first document image is determined to be relevant to the selected predetermined concept, at least one aspect of the relevancy indicator being determined at least in part by the determined level of relevance of the associated document;
where the second document image is displayed that is determined to be relevant to the selected predetermined concept, highlighting at least part of a user-readable portion of the second document image that includes at least one word determined to be relevant to the selected first predetermined concept;

wherein the document viewing region is a document closet image; and wherein each first view includes a title on a side of the first document image in the first slanted orientation.

20. The method of claim 19, wherein the first document image further comprises a title of a first document whose contents are displayed in the first document image.

21. The method of claim 19, wherein generating the second document image comprises rotating the first document image along an axis to position the contents of the second document image in the face up orientation.

22. A computer program product stored on a computer readable storage medium for managing a plurality of documents, the computer program product comprising:

code for displaying a graphical user interface (GUI) on a display, the GUI containing a document viewing region;

code for displaying a plurality of first document images in the document viewing region, each first document image showing a first view of at least a portion of contents of a respective document in a plurality of documents, the first view showing the portion being oriented in a first slanted orientation;

code for generating a second document image corresponding to the entire respective document and showing a second view of the portion of contents in response to the selection of the first document image, the second view displaying the portion in a face up orientation, wherein the displayed portion of the second document image is not covered by any other document image and is visible to a user, wherein the second document image covers a portion of at least one first document image when displaying the second view, and wherein the second document image has associated therewith a scrolling mechanism configured to allow a user to scroll through any contents of the second document image not initially shown in the second view;

code for displaying a set of predetermined concepts in the GUI, each of the plurality of documents relating to at least one of a plurality of possible concepts;

code for analyzing words contained within a user-readable portion of each of the plurality of documents to determine a level of relevance of each document with respect to each of the set of predetermined concepts; and code for, in response to receiving a selection of a first predetermined concept from the set of predetermined concepts:

displaying a relevancy indicator for each first document image displayed in the document viewing region where the document associated with that first document image is determined to be relevant to the selected predetermined concept, at least one aspect of the relevancy indicator being determined at least in part by the determined level of relevance of the associated document;

where the second document image is displayed that is determined to be relevant to the selected predetermined concept, highlighting at least part of a user-readable portion of the second document image that includes at least one word determined to be relevant to the selected first predetermined concept;

wherein the document viewing region is a document closet image; and wherein each first view includes a title on a side of the first document image in the first slanted orientation.

23. The computer program product of claim 22, wherein the first document image further comprises a first title of a first document whose contents are displayed in the first document image.

24. The computer program product of claim 22, wherein code for generating the second document image comprises code for rotating the first document image along an axis to position the contents of the second document image in the face up orientation.

25. An apparatus for managing documents in a computer system, the apparatus comprising:

a memory;

a display;

a user input device, and a processor operatively disposed to:

display a graphical user interface (GUI) on the display, the GUI containing a document viewing region;

display a plurality of first document images in the document viewing region, each first document image showing a first view of at least a portion of contents of a respective document in a plurality of documents, the first view showing the portion being oriented in a first slanted orientation;

generate a second document image corresponding to the entire respective document and showing a second view of the portion of contents in response to the selection of the first document image, the second view displaying the portion in a face up orientation, wherein the displayed portion of the second document image is not covered by any other document image and is visible to a user, wherein the second document image covers a portion of at least one first document image when displaying the second view, and wherein the second document image has associated therewith a scrolling mechanism configured to allow a user to scroll through any contents of the second document image not initially shown in the second view;

display a set of predetermined concepts in the GUI, each of the plurality of documents including text relating to at least one of a plurality of possible concepts;

analyze words contained within a user-readable portion of each of the plurality of documents to determine a level of relevance of each document with respect to each of the set of predetermined concepts; and in response to receiving a selection of a first predetermined concept from the set of predetermined concepts:

display a relevancy indicator for each first document image displayed in the document viewing region where the document associated with that first document image is determined to be relevant to the selected predetermined concept, at least one aspect of the relevancy indicator being determined at least in part by the determined level of relevance of the associated document;

where the second document image is displayed that is determined to be relevant to the selected predetermined concept, highlight at least part of a user-readable portion of the second document image that includes at least one word determined to be relevant to the selected first predetermined concept;

wherein the document viewing region is a document closet image; and wherein each first view includes a title on a side of the first document image in the first slanted orientation.

26. The apparatus of claim 25, wherein the first document image comprises a first title of a first document whose contents are displayed in the first document image.

27. The apparatus of claim 25, wherein the processor is operatively disposed to rotate the first document image along an axis to position the contents of the document image in the face up orientation.

28. A computer-implemented method of selecting a document from a plurality of stored documents, comprising:
- displaying a plurality of first document images, each including a first view of one of the plurality of documents in a directory window;
- receiving a signal initiated by a user indicating a selected document of the plurality of document images;
- displaying a second document image for the selected document at approximately the location of the first view in the directory window such that substantially only a second view of the selected document is displayed, the second document image including the second view of a selected document and a mechanism allowing the user to view any content not initially displayed in the second view;
- allowing the user to further select the selected document for use outside the directory window;
- displaying a set of predetermined concepts in the GUI, each of the plurality of documents relating to at least one of a plurality of possible concepts;
- analyzing words contained within a user-readable portion of each of the plurality of documents to determine a level of relevance of each document with respect to each of the set of predetermined concepts; and
- in response to receiving a selection of a first predetermined concept from the set of predetermined concepts:
- displaying a relevancy indicator for each first document image displayed in the document viewing region where the document associated with that first document image is determined to be relevant to the selected predetermined concept, at least one aspect of the relevancy indicator being determined at least in part by the determined level of relevance of the associated document;
- where the second document image is displayed that is determined to be relevant to the selected predetermined concept, highlighting at least part of a user-readable portion of the second document image that includes at least one word determined to be relevant to the selected first predetermined concept; and
- wherein the document viewing region is a document closet image; and
- wherein each first view includes a title on a side of the first document image in the first slanted orientation.

* * * * *